United States Patent
Gokita

(10) Patent No.: US 11,283,592 B2
(45) Date of Patent: Mar. 22, 2022

(54) RECORDING MEDIUM, DATA COLLECTION DEVICE, AND DATA COLLECTION METHOD

(71) Applicant: FUJITSU LIMITED, Kawasaki (JP)

(72) Inventor: Shun Gokita, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 264 days.

(21) Appl. No.: 16/710,299

(22) Filed: Dec. 11, 2019

(65) Prior Publication Data

US 2020/0228312 A1    Jul. 16, 2020

(30) Foreign Application Priority Data

Jan. 10, 2019   (JP) .............................. JP2019-002414

(51) Int. Cl.
  *H04L 9/06*      (2006.01)
  *H04L 12/26*     (2006.01)
  *H04L 43/16*     (2022.01)

(52) U.S. Cl.
  CPC .......... *H04L 9/0625* (2013.01); *H04L 9/0643* (2013.01); *H04L 43/16* (2013.01)

(58) Field of Classification Search
  CPC ..... H04L 9/0625; H04L 9/0643; H04L 43/16; H04L 9/3239
  See application file for complete search history.

(56) References Cited

U.S. PATENT DOCUMENTS

| | | | | |
|---|---|---|---|---|
| 5,990,810 A | * | 11/1999 | Williams | G06F 3/0608 |
| | | | | 341/51 |
| 8,271,687 B2 | * | 9/2012 | Turner | H04L 67/108 |
| | | | | 709/246 |
| 9,292,925 B2 | * | 3/2016 | Kawashima | G06T 7/73 |
| 9,542,401 B1 | * | 1/2017 | Veeraswamy | G06F 16/128 |
| 9,830,342 B2 | * | 11/2017 | Dolph | G06F 16/215 |
| 10,228,934 B2 | * | 3/2019 | Kurosawa | G06F 3/0608 |
| 10,747,724 B2 | * | 8/2020 | Sergeev | G06F 16/162 |
| 2013/0268499 A1 | * | 10/2013 | Kirihata | G06F 16/90 |
| | | | | 707/692 |

FOREIGN PATENT DOCUMENTS

| | | |
|---|---|---|
| JP | 9-510559 | 10/1997 |
| JP | 2012-141738 | 7/2012 |
| WO | 95/19003 | 7/1995 |

* cited by examiner

*Primary Examiner* — Mohammed Waliullah
(74) *Attorney, Agent, or Firm* — Fujitsu Patent Center

(57) ABSTRACT

A non-transitory computer-readable recording medium storing a program that causes a computer to execute a process, the process includes comparing first data previously acquired from a data transmission source device and second data currently acquired from the device to specify a difference portion of the second data as compared with the first data; determining a dividing position of the second data so that the difference portion is made into a single block; dividing the second data into first blocks at the dividing position; transmitting, to the device, a first hash value for each of the first blocks and information on the dividing position; and receiving, from the device, the second block corresponding to a second hash value different from the first hash value for each of the first blocks, among second blocks obtained by dividing third data held by the device based on the information on the dividing position.

5 Claims, 15 Drawing Sheets

FIG. 10

| LOGICAL-PHYSICAL CONVERSION TABLE ||||| T1 |
|---|---|---|---|---|
| PHYSICAL BLOCK ID | LOGICAL BLOCK ID | LOGICAL ADDRESS | PHYSICAL ADDRESS | SIZE (Bytes) |
| 0 | b | 0xaaaabbbb | 0x00000000 | 16 |
|   | j | 0xbbbbcccc | 0x00000010 | 16 |
|   | k | 0xccccdddd | 0x00000020 | 16 |
|   | h | 0xccccdddd | 0x00000030 | 16 |
| 1 | a | 0xddddeeee | 0x00000040 | 32 |
| 2 | c | 0xeeee0000 | 0x00000060 | 48 |
| ... | ... | ... | ... | ... |

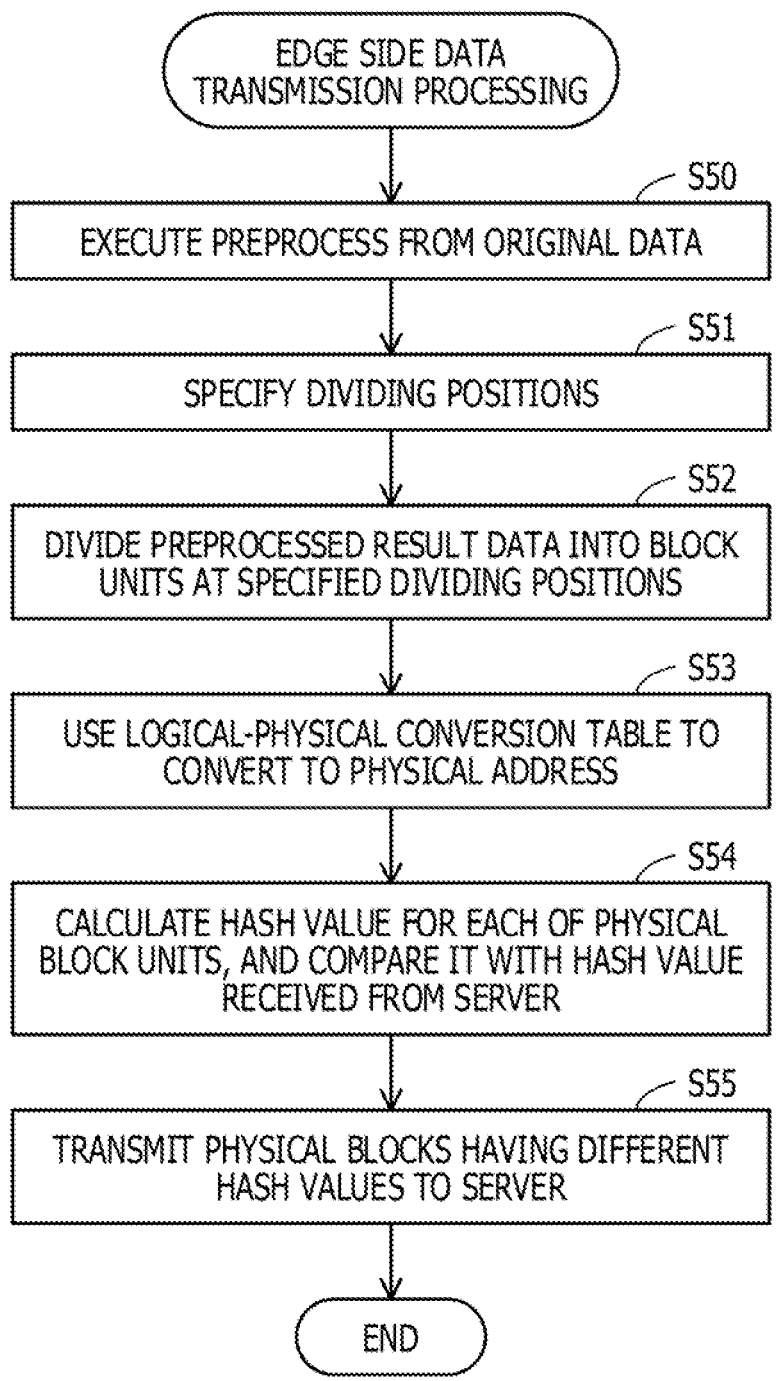

RECORDING MEDIUM, DATA COLLECTION DEVICE, AND DATA COLLECTION METHOD

CROSS-REFERENCE TO RELATED APPLICATION

This application is based upon and claims the benefit of priority of the prior Japanese Patent Application No. 2019-2414, filed on Jan. 10, 2019, the entire contents of which are incorporated herein by reference.

FIELD

The embodiments discussed herein are related to a recording medium, a data collection device, and a data collection method.

BACKGROUND

A system is used which transmits data accumulated in a data transmission source device from the device to a host device. For example, there is a proposal of an information management method in which, when expanding the storage capacity of a file server using an online storage service, the file server divides the file into block files to be managed. In the proposed information management method, the file server does not upload to the online storage service a block which overlaps a block file group that has already been registered/stored, but only changes the file configuration information.

There is a proposal of a file transfer method in which the receiving computer divides the old file into segments, calculates the hash number for each segment, and transfers these hash numbers to the transmitting computer. In the proposed file transfer method, the transmitting computer examines each segment of the new file and determines which segment has a hash number that matches the hash number received from the receiving computer. The transmitting computer notifies the receiving computer of matching segments which match the new file. The receiving computer then constructs a copy of the new file from the matching segments of the old file.

Related techniques are disclosed in, for example, Japanese Laid-open Patent Publication No. 2012441738 and Japanese National Publication of International Patent Application No. 9-510559.

It is conceivable that, when the data transmission source device divides data into blocks and opts not to transmit to the host device the blocks that overlap the blocks stored in the host device, it is possible to suppress the transfer of the overlapping blocks. For example, when the host device requests data from the transmission source device, sending the past data enables the transmission source device to send only a difference block from the past data.

Here, in order to further reduce the data transfer volume, it is conceivable to calculate in the host device the hash value for each predetermined block unit, and transmit the calculated block-unit hash value from the host device to the transmission source device. The transmission source device obtains a block-unit hash value for the accumulated data, and is capable of specifying data to be transmitted according to the difference from the hash value transmitted from the host device.

However, in this case, the unit of the data size transmitted from the transmission source device is a block unit, which is a calculation unit of the hash value. Therefore, even when there is a difference in part of a block, the transmission source device transmits the entire block, and there is a problem that the data transfer volume may not be sufficiently reduced. In view of the above, it is desirable to be able to provide a data collection program, a data collection device, and a data collection method which make it possible to reduce data transfer volume.

SUMMARY

According to an aspect of the embodiments, a non-transitory computer-readable recording medium storing a program that causes a computer to execute a process, the process includes comparing first data previously acquired from a data transmission source device and second data currently acquired from the data transmission source device to specify a difference portion of the second data as compared with the first data; determining a dividing position of the second data so that the difference portion is made into a single block; dividing the second data into a plurality of first blocks at the determined dividing position; transmitting, to the data transmission source device, a first hash value for each of the plurality of first blocks and information on the dividing position; and receiving, from the data transmission source device, the second block corresponding to a second hash value different from the first hash value for each of the plurality of first blocks, among second blocks obtained by dividing third data held by the device based on the information on the dividing position.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 10 is a diagram illustrating an example of a logical-physical conversion table;

FIG. 15 is a flowchart illustrating an example (part 2) of the edge side data transmission process.

DESCRIPTION OF EMBODIMENTS

Hereinafter, the present embodiments will be described with reference to the drawings.

First Embodiment

A first embodiment will be described.

Figure 1:
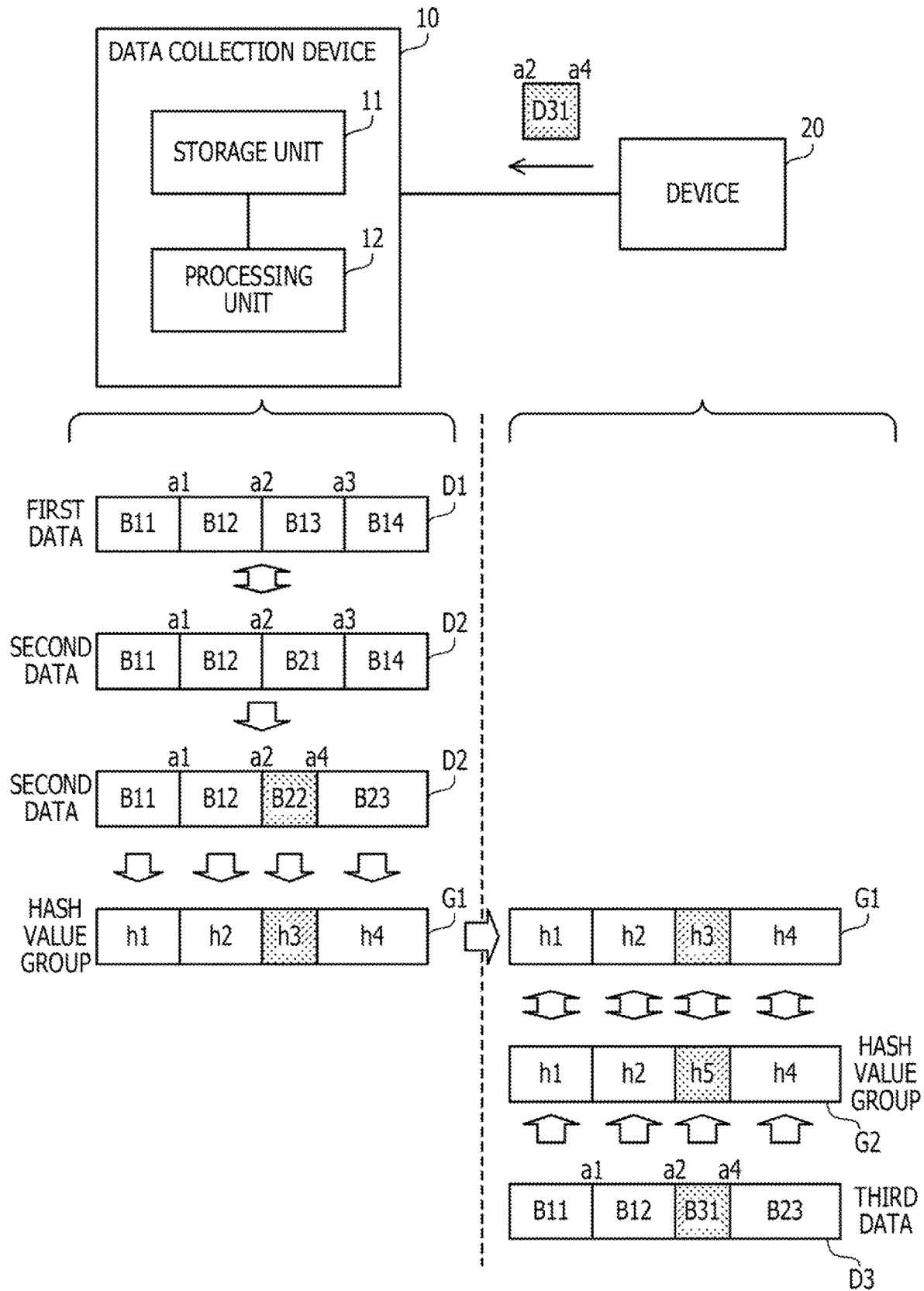
FIG. 1 is a diagram illustrating a data collection device according to a first embodiment.

FIG. 1 is a diagram illustrating a data collection device according to a first embodiment.

A data collection device 10 communicates with a device 20 via a network and collects data held by the device 20. The device 20 is, for example, an information processing device such as a computer, a sensor device, or a device equipped with a sensor device (for example, a moving body such as an automobile equipped with a sensor device). The device 20 includes a memory for storing data to be transmitted to the data collection device 10.

The data collection device 10 includes a storage unit 11 and a processing unit 12. The storage unit 11 may be a volatile storage device such as a random-access memory (RAM), or a nonvolatile storage device such as a hard disk drive (HDD) or a flash memory. The processing unit 12 may include a central processing unit (CPU), a digital signal processor (DSP), an application specific integrated circuit (ASIC), a field-programmable gate array (FPGA), or the like. The processing unit 12 may be a processor which executes a program. The "processor" referred to herein may include a set of a plurality of processors (a multiprocessor).

The storage unit 11 stores data collected from the device 20. For example, the storage unit 11 stores first data D1 which the processing unit 12 previously acquired from the device 20. The first data D1 is divided into units of a predetermined size called blocks. For example, the first data D1 includes blocks B11, B12, B13, and B14 obtained by dividing the first data D1 from the start to the end at dividing positions a1, a2, and a3. The dividing positions are indicated by an address from the start of the data (for example, when a1, a2, and a3 indicate addresses, the starting address<a1 <a2<a3<the ending address). The information on the dividing positions is determined in advance for the data collection device 10 and is notified from the data collection device 10 to the device 20 in advance.

The processing unit 12 acquires data from the device 20. For example, the processing unit 12 here acquires second data D2 from the device 20. The size of the second data D2 is the same as the size of the first data D1. The processing unit 12 may calculate the hash values (sometimes referred to as summary values) of the blocks B11, B12, B13, and B14, and transmit the calculated hash values to the device 20.

The device 20 receives the hash values, and among the new data held by the device 20, sends the device 20 the blocks having different hash values from the received hash values and identification information such as an address indicating the block positions of the blocks in the new data. Among the blocks of new data, the blocks corresponding to the same hash values as the hash values received from the data collection device 10 have been transmitted to the data collection device 10 and are already held by the data collection device 10. On the other hand, among the blocks of new data, the blocks corresponding to the hash values different from the hash values received from the data collection device 10 are yet to be transmitted to the data collection device 10. Therefore, the device 20 is allowed to avoid transmitting overlapping data to the data collection device 10 by transmitting only the blocks having different hash values.

The second data D2 includes blocks B11, B12, B21, and B14 obtained by dividing the second data D2 from the start to the end at dividing positions a1, a2, and a3. In the second data D2, the blocks B11, B12, and B14 are common to the first data 01, and the block B21 is not common. Therefore, in this case, the device 20 may transmit only the block B21 of the second data D2 to the data collection device 10.

When receiving the block B21 and the block position identification information on the block B21 in the second data D2 from the device 20, the processing unit 12 determines that the block B21 is an update section for the block B13. For this reason, the data collection device 10 obtains the second data D2 by replacing the block B13 of the first data D1 with the block B21. In this way, the data collection device 10 may appropriately acquire the second data D2 by reducing the data collection for the overlapping blocks.

The processing unit 12 further compares the first data D1 and the second data D2, and according to the comparison, specifies a difference portion of the second data D2 as compared with the first data D1, and determines the dividing positions of the blocks of the second data D2 so that the difference portion made into a single block B22. For example, assume that, in the second data D2, the range from the dividing position a2 to the address a4 (where a4 is an address greater than the dividing position a2 and less than the dividing position a3) is a section different in content from the same range of the first data D1, and the other sections have the same content as the first data D1. Then, for example, the processing unit 12 determines the dividing positions a1, a2, and a4 as the dividing positions of the blocks of the second data D2.

The processing unit 12 divides the second data D2 into blocks B11, B12, B22, and B23 (multiple first blocks) at the determined dividing positions a1, a2, and a4. The processing unit 12 transmits to the device 20 the hash value (first hash value) for each of the blocks B11, B12, B22, and B23 and the information on the dividing positions a1, a2, and a4, The hash values of the blocks B11, B12, B22, and B23 are hash values h1, h2, h3, and h4.

The device 20 receives the hash value for each of the blocks B11, B12, B22, and B23 and the information on the dividing positions a1, a2, and a4. The memory of the device 20 stores third data D3 which is yet to be transmitted to the data collection device 10 and is the next transmission target. The size of the third data D3 is the same as the size of the second data D2. The device 20 divides the third data D3 into blocks B11, B12, B31, and B23 (multiple second blocks) based on the information on the dividing positions a1, a2, and a4. The device 20 obtains the hash value (second hash value) for each of the blocks B11, B12, B31, and B23. The hash values of the blocks B11, B12, B31, and B23 are hash values h1, h2, h5, and h4, respectively. The device 20 transmits to the data collection device 10 the block B31 corresponding to the hash value h5 different from the received hash values h1, h2, h3, and h4 among the hash values h1, h2, h5, and h4. Here, for example, the device 20 transmits to the data collection device 10 the identification information on the block position of the block B31 in the third data D3.

For example, among the blocks B11, B12, B31, and B23, the processing unit 12 receives from the device 20 only the block B31 corresponding to the hash value h5 different from the hash values h1, h2, h3, and h4 transmitted to the device 20. For example, the processing unit 12 receives the block position identification information on the third data D3 from the device 20 together with the block B31, and obtains, based on the identification information, the third data D3 by changing the block B22, among the blocks B11, B12, B22, and B23, to the block B31.

As above, by changing the data dividing positions, the data collection device 10 may reduce the data transfer volume.

For example, it is conceivable not to change the dividing positions a2, a2, and a3 of the original transmission target data. However, in the case of the example of FIG. 1, when the data of the dividing positions a2 to a3 of the third data D3 is transmitted to the device 20 even though the difference of the third data D3 as compared with the second data D2 is a section of the dividing positions a2 to a4, redundant data transmission is performed for the section from the address a4 to the dividing position a3.

On the other hand, for example, the data collection device 10 updates the dividing positions a1, a2, and a3 to the dividing positions a1, a2, and a4 according to the comparison between the first data D1 and the second data D2. For this reason, in the example of FIG. 1, it is possible to avoid transmitting to the device 20 the section of the dividing positions a4 to a3 in the third data D3. In the device 20, when the change in the update positions in the data in a certain period is relatively small, or when the update positions in the data in a certain period do not change, the data collection method by the data collection device 10 increases the effect of reducing the transfer volume.

Second Embodiment

Next, a second embodiment will be described.

Figure 2:
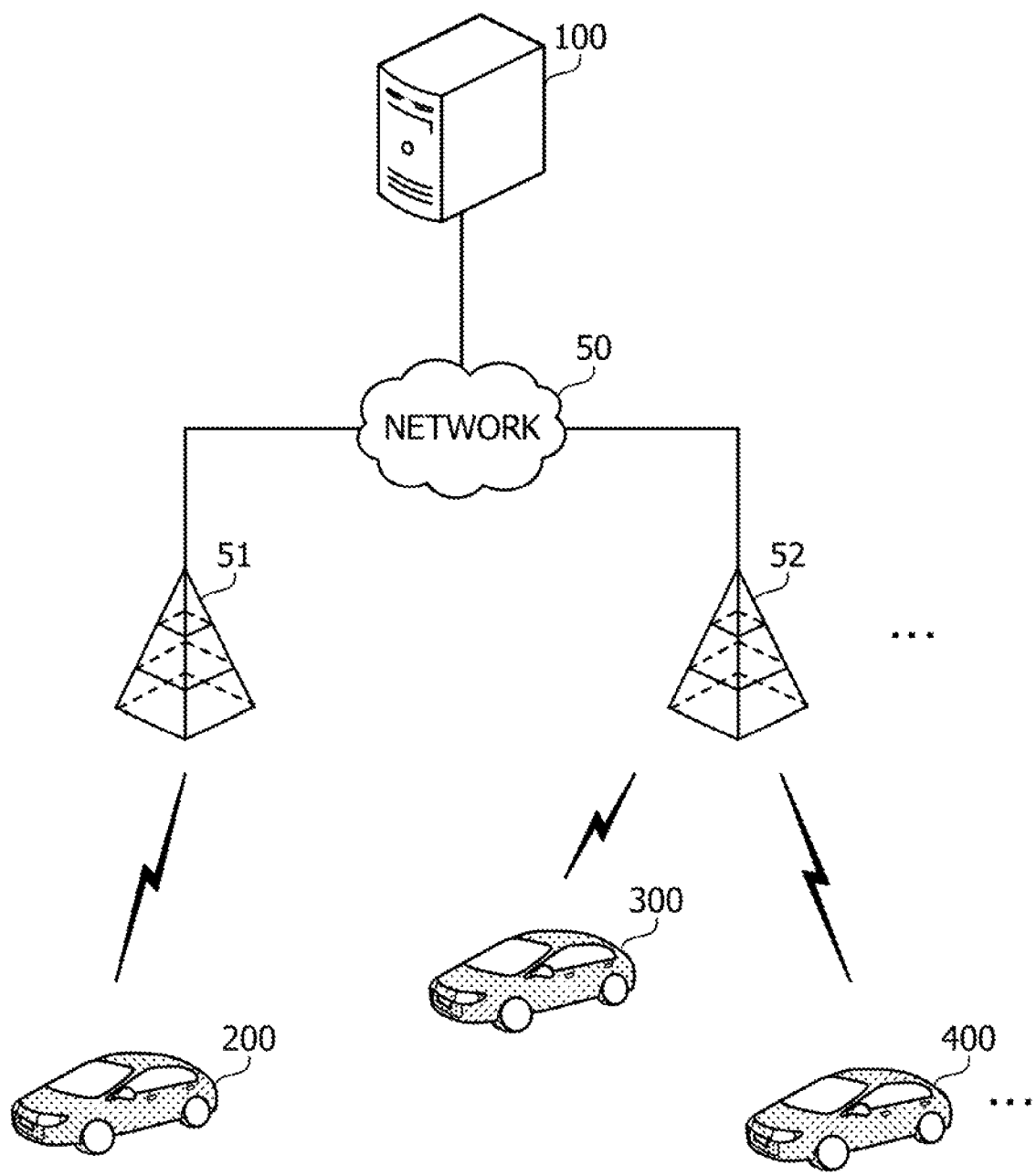
FIG. 2 is a diagram illustrating a data collection system according to a second embodiment.

FIG. 2 is a diagram illustrating a data collection system according to a second embodiment.

The data collection system according to the second embodiment includes a server 100 and edges 200, 300, 400, The server 100 is coupled to a network 50. The network 50 is, for example, a wide area network (WAN). The network 50 is coupled with base stations 51, 52, Each of the base stations 51, 52, . . . wirelessly communicates with the edges existing in the area to which the base station belongs. The server 100 and each edge may communicate with each other via the network 50 and a base station in any area.

The server 100 is a server computer which collects and analyzes data acquired by the edges 200, 300, 400, . . . from the edges 200, 300, 400, . . . . The server 100 specifies a period and area for which data is to be collected in response to a user analysis request, and collects data related to the specified period and area from the edges 200, 300, 400, . . . . In the second embodiment, as data acquired by the edges 200, 300, 400, . . . , rainfall data is exemplified. Based on the rainfall data collected from the edges 200, 300, 400, . . . , the server 100 analyzes the rainfall in the areas where the edges 200, 300, 400, . . . exist.

However, the type of data to be collected may be other than rainfall, and it is possible to consider, for example, various types such as temperature, humidity, wind flow, amount of vibration, atmospheric substance concentration, radiation dose, electromagnetic waves (for example, information converted into an image), or sound. The server 100 is an example of the data collection device 10 according to the first embodiment.

The edges 200, 300, 400, . . . are moving bodies or devices mounted on the moving bodies. The moving body is a vehicle, an animal, a ship, a flying body, a robot, or the like. Each of the edges 200, 300, 400, . . . includes a raindrop sensor, and acquires rainfall data using the raindrop sensor. The edges 200, 300, 400, . . . have a wireless communication function, and wirelessly communicate with the base stations in the areas where they exist. The edges 200, 300, 400, . . . transmit the acquired rainfall data to the server 100 in response to a request from the server 100.

Each of the edges 200, 300, 400, is an example of the device 20 of the first embodiment.

Figure 3:
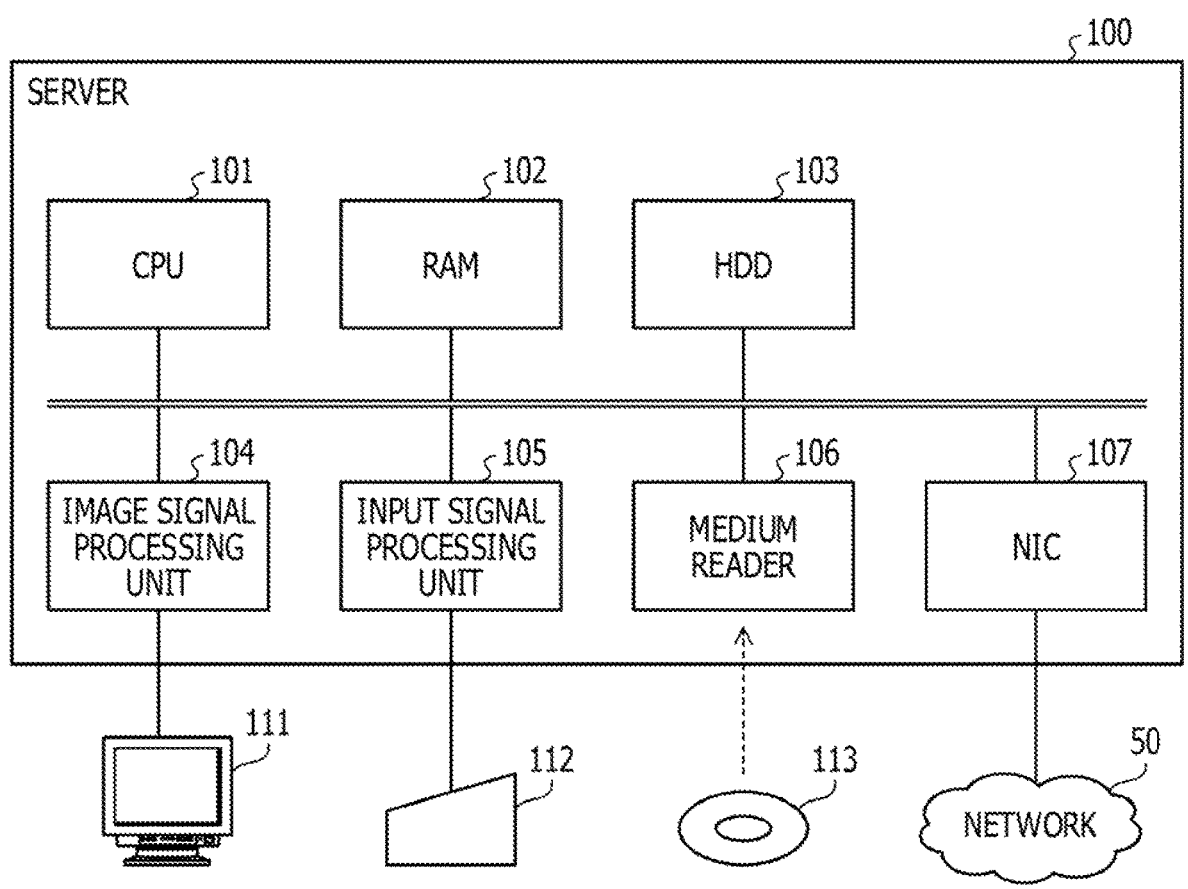
FIG. 3 is a diagram illustrating an example of hardware of a server.

FIG. 3 is a diagram illustrating an example of hardware of a server.

The server 100 includes a CPU 101, a RAM 102, an HDD 103, an image signal processing unit 104, an input signal processing unit 105, a medium reader 106, and a network interface card (NIC) 107. Note that the CPU 101 corresponds to the processing unit 12 of the first embodiment. The RAM 102 or the HDD 103 corresponds to the storage unit 11 of the first embodiment.

The CPU 101 is a processor that executes program instructions. The CPU 101 loads at least part of the program or data stored in the HDD 103 into the RAM 102 and executes the program. The CPU 101 may include a plurality of processor cores. Alternatively, the server 100 may include a plurality of processors. Processing to be described below may be performed in parallel using a plurality of processors or processor cores. A set of a plurality of processors may be referred to as a "multiprocessor" or simply a "processor".

The RAM 102 is a volatile semiconductor memory that temporarily stores a program to be executed by the CPU 101 and data to be used for computation by the CPU 101. The server 100 may include a type of memory other than the RAM, and may include a plurality of memories.

The HDD 103 is a nonvolatile storage device for storing a software program such as an operating system (OS), middleware, or application software, and data. The server 100 may include a storage device of another type such as a flash memory or a solid state drive (SSD) or may include a plurality of nonvolatile storage devices.

The image signal processing unit 104 outputs an image to a display 111 coupled to the server 100 in accordance with an instruction from the CPU 101. As the display 111, any type of display such as a cathode ray tube (CRT) display, a liquid crystal display (LCD), a plasma display, or an organic electro-luminescence (OIL) display may be used.

The input signal processing unit 105 acquires an input signal from an input device 112 coupled to the server 100, and outputs the input signal to the CPU 101. As the input device 112, a pointing device such as a mouse, a touch panel, a touchpad, or a trackball, a keyboard, a remote controller, a button switch, or the like may be used. A plurality of types of input devices may be coupled to the server 100.

The medium reader 106 is a reading device that reads programs and data recorded in a recording medium 113. As the recording medium 113, for example, a magnetic disk, an optical disk, a magneto-optical disk (MO), a semiconductor memory, or the like may be used. The magnetic disk includes a flexible disk (FD) or a hard disk drive (HDD). The optical disc includes a compact disc (CD) or a digital versatile disc (DVD).

The medium reader 106 copies a program or data read from the recording medium 113 to another recording medium such as the RAM 102 or the HDD 103. The read program is executed by, for example, the CPU 101. The recording medium 113 may be a portable recording medium, or may be used to distribute programs or data. The recording medium 113 or the HDD 103 may be referred to as a computer-readable recording medium.

The NIC 107 is coupled to a network 50 and is an interface that communicates with another computer via the network 50. The NIC 107 is coupled to a communication device such as a switch or a router belonging to the network 50, by a cable, for example.

Figure 4:
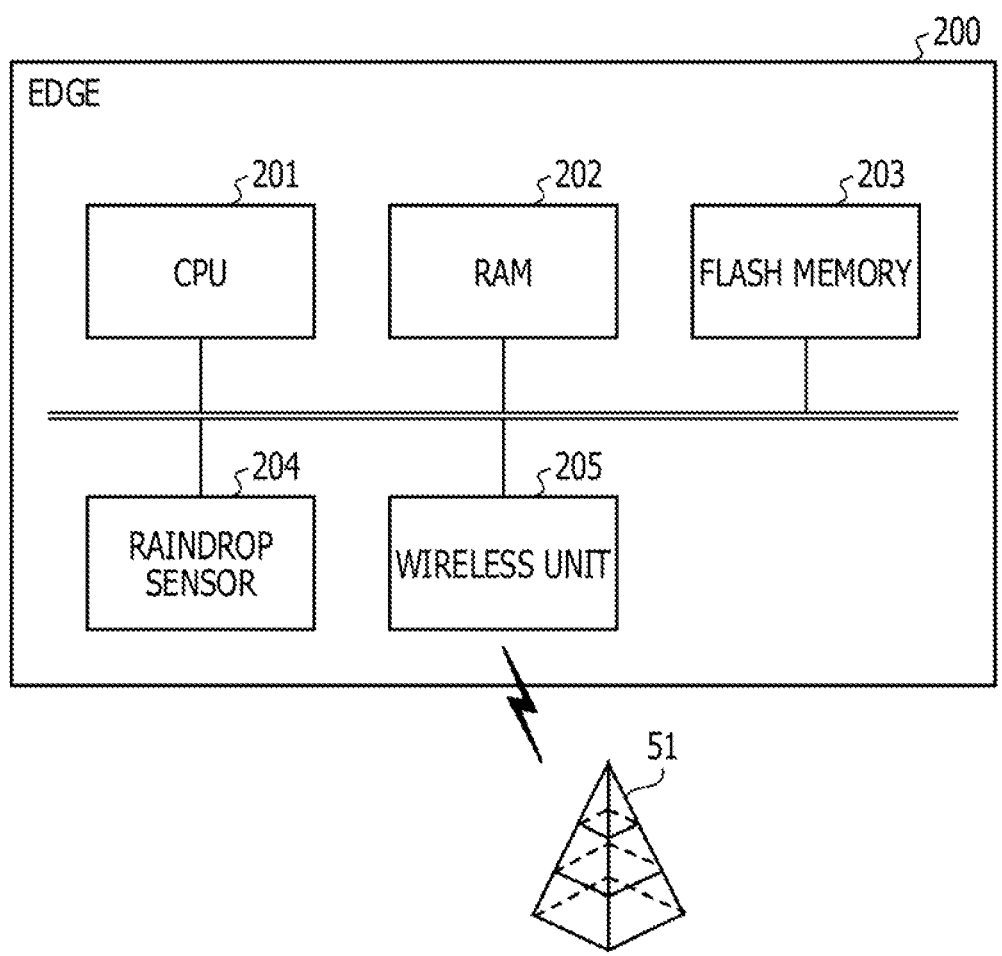
FIG. 4 is a diagram illustrating an example of hardware of an edge.

FIG. 4 is a diagram illustrating an example of hardware of an edge.

The edge 200 Includes a CPU 201, a RAM 202, a flash memory 203, a raindrop sensor 204, and a wireless unit 205.

The CPU 201 is a processor that executes program instructions. The CPU 201 loads at least part of the program or data stored in the flash memory 203 into the RAM 202 and executes the program. The CPU 201 may include a plurality of processor cores. The edge 200 may have a plurality of processors.

The RAM 202 is a volatile semiconductor memory that temporarily stores a program to be executed by the CPU 201 and data to be used for computation by the CPU 201.

The flash memory 203 is a non-volatile memory device that stores a program of software such as firmware, and data.

The raindrop sensor 204 is a sensor that detects the rainfall around the edge 200. The raindrop sensor 204 stores the detected rainfall data in the RAM 202 or the flash memory 203.

The wireless unit 205 is a wireless communication interface that may be wirelessly coupled to the base stations 51, 52, . . . . The wireless unit 205 communicates with the server 100 via a base station that covers an area where the edge 200 exists.

When the edge 200 itself moves, the edge 200 has a moving mechanism such as a motor or an engine, which is not illustrated in FIG. 4.

The edges 300, 400, are also achieved by the same hardware as the edge 200.

Figure 5:
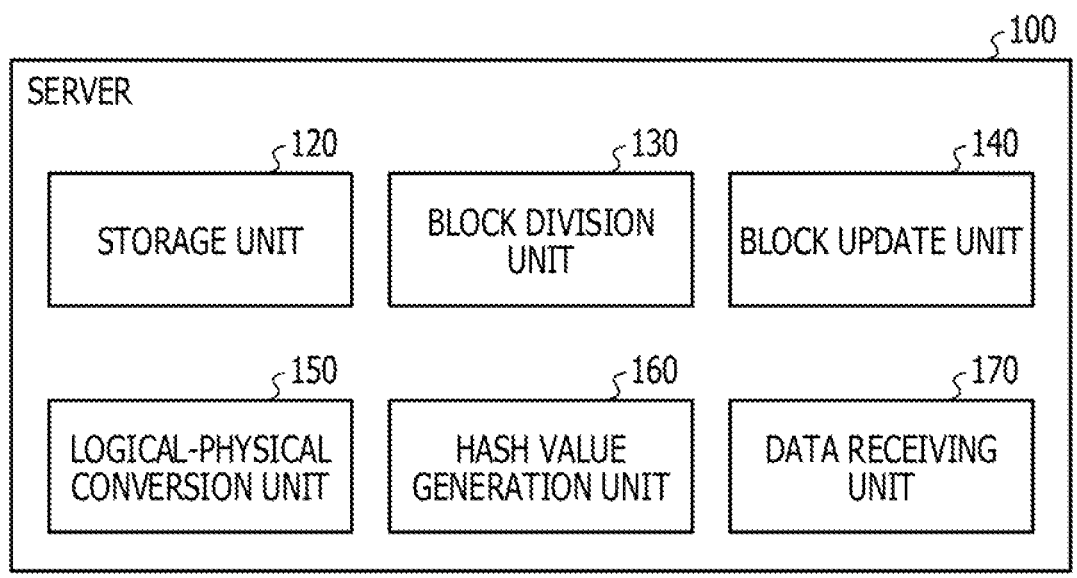
FIG. 5 is a diagram illustrating a function example of the server.

FIG. 5 is a diagram illustrating a function example of the server.

The server 100 includes a storage unit 120, a block division unit 130, a block update unit 140, a logical-physical conversion unit 150, a hash value generation unit 160, and a data receiving unit 170. The storage unit 120 is achieved by using a storage area of the RAM 102 or the HDD 103. The block division unit 130, the block update unit 140, the logical-physical conversion unit 150, the hash value generation unit 160, and the data receiving unit 170 are achieved by the CPU 101 executing a program stored in the RAM 102.

Processing by these functions of the server 100 is executed for each edge. In the following, the processing for the edge 200 is exemplified, but the same processing is performed for the edges 300, 400, . . . .

The storage unit 120 stores data collected from the edges 200, 300, 400, . . . .

The block division unit 130 divides the data stored in the storage unit 120 into a plurality of sections. One section is referred to as a block. The block division unit 130 divides the data into blocks based on the data dividing position information stored in the storage unit 120.

The block update unit 140 updates the dividing position information stored in the storage unit 120. The block size may vary from block to block.

The logical-physical conversion unit 150 performs conversion from a logical block group to a physical block group. The logical block group is a block group immediately after the data is divided based on the information on the dividing positions (result of division by the block division unit 130). The physical block group is a block group in which a block group having a difference from the previous data is arranged at the start among the block groups immediately after being divided based on the information on the dividing positions. The logical-physical conversion unit 150 generates a logical-physical conversion table indicating a logical-physical conversion method according to the logical-physical conversion results, and transmits the logical-physical conversion table to the edge 200. The logical-physical conversion table includes information on the dividing positions.

The hash value generation unit 160 generates a hash value for each block. The hash value generation unit 160 transmits the generated hash values to the corresponding edge 200. The edge 200 transmits to the server 100 a block corresponding to a hash value different from the hash value received from the server 100 among the new data to be transmitted, and does not transmit the other blocks of the new data. Together with the block to be transmitted, the edge 200 transmits to the server 100 the block position identification information on the block in the new data.

The data receiving unit 170 receives the block transmitted by the edge 200. The data receiving unit 170 obtains new data of the edge 200 by applying the block currently received from the edge 200 to the previously received data. "Applying" indicates that, regarding the block position of the block received this time, the block at the block position of the previous data is replaced with the block received this time.

The server 100 executes such processing for each edge, and collects data from the edges 200, 300, 400, . . . .

Figure 6:
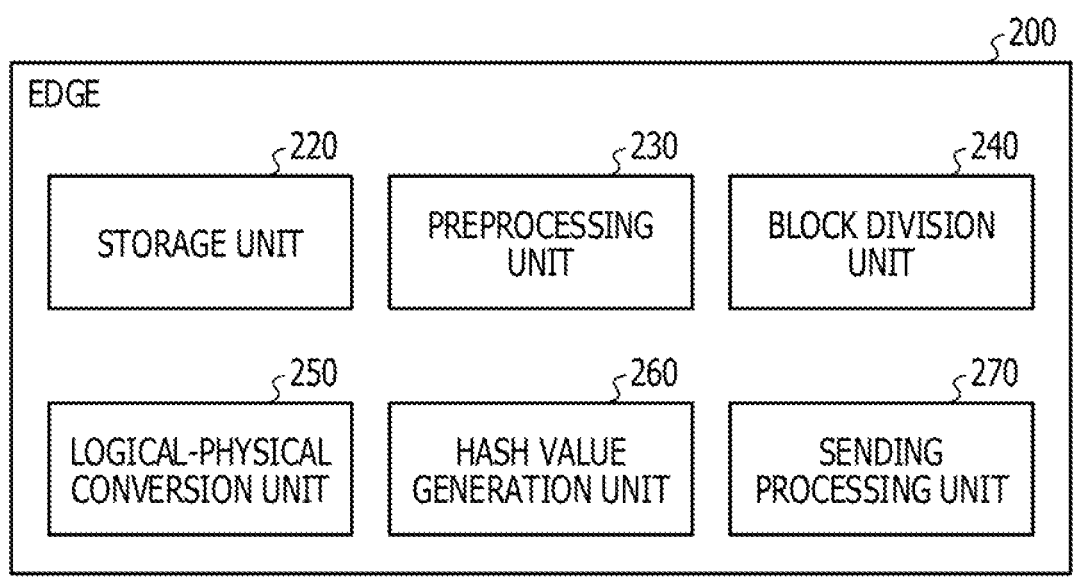
FIG. 6 is a diagram illustrating a function example of the edge.

FIG. 6 is a diagram illustrating a function example of the edge.

The edge 200 includes a storage unit 220, a preprocessing unit 230, a block division unit 240, a logical-physical conversion unit 250, a hash value generation unit 260, and a sending processing unit 270. The storage unit 220 is achieved by using a storage area of the RAM 202 or the flash memory 203. The preprocessing unit 230, the block division unit 240, the logical-physical conversion unit 250, the hash value generation unit 260, and the sending processing unit 270 are achieved by the CPU 201 executing a program stored in the RAM 202.

The storage unit 220 stores original data, preprocessed data, and a logical-physical conversion table including information on dividing positions received from the server 100, and the like. The original data is data to be subjected to a predetermined preprocess at the edge 200, and is, for example, rainfall data acquired at one-second intervals. The preprocess is a process that is performed on the original data before data transmission to the server 100, and is, for example, processing for obtaining the average rainfall at one-minute intervals from the rainfall data acquired at one-second intervals. The preprocessed data is data generated by the preprocess.

The preprocessing unit 230 performs a preprocess on the original data stored in the storage unit 220. The preprocessing unit 230 stores the preprocessed data in a predetermined area of the storage unit 220 or the RAM 202.

The block division unit 240 divides the preprocessed data into a plurality of blocks based on the information on the dividing positions. The result of division by the block division unit 240 is a logical block group.

The logical-physical conversion unit 250 performs conversion from the logical block group to the physical block group based on the logical-physical conversion table.

The hash value generation unit 260 generates a hash value for each physical block included in the physical block group.

The sending processing unit 270 collates the hash value generated by the hash value generation unit 260 with the hash value received from the server 100, and transmits a physical block having a different hash value to the server 100.

The edges 300, 400, . . . have the same function as the edge 200.

Figure 7A:
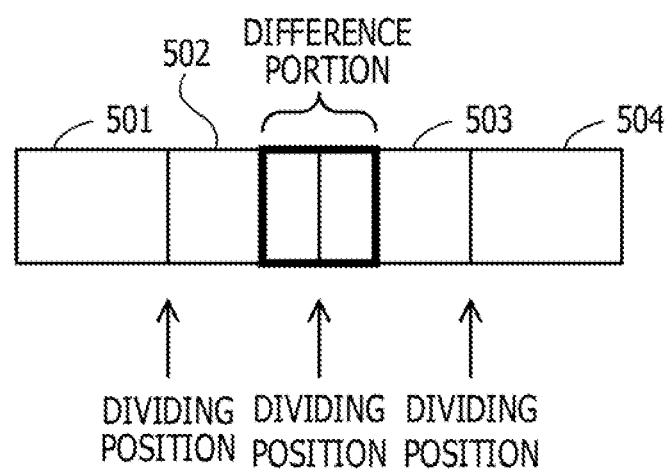
FIGS. 7A and 7B are each a diagram illustrating an example of a difference portion.
Figure 7B:
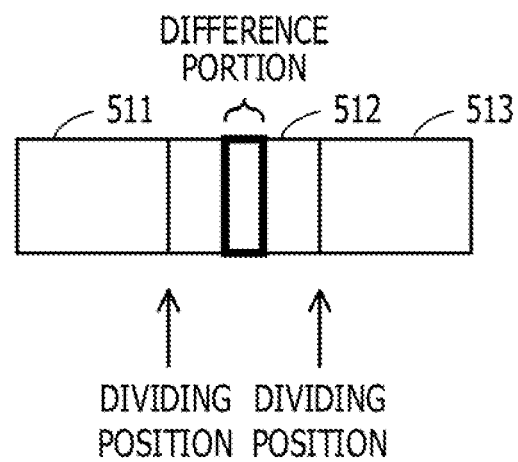

FIGS. 7A and 7B are each a diagram illustrating an example of a difference portion.

FIG. 7A illustrates an example in which a difference portion exists at the boundary of a block dividing position between the previous data transmitted by the edge 200 and the current data. In the example of FIG. 7A, a difference portion exists at the boundary between the blocks 502 and 503 among the four blocks 501, 502, 503, and 504.

When the block size is not changed, the whole of each of the blocks 502 and 503 is transmitted from the edge 200 to the server 100 in the example of FIG. 7A. However, the blocks 502 and 503 each include a portion already acquired by the server 100 other than the difference portion. Transmission of the portion acquired by the server 100 is redundant data transmission.

FIG. 7S illustrates an example in which a difference portion exists at a portion inside a single block between the previous data transmitted by the edge 200 and the current data. In the example of FIG. 7B, a difference portion exists at a portion inside the block 512 among the three blocks 511, 512, and 513.

When the block size is not changed, the block 512 is transmitted from the edge 200 to the server 100 in the example of FIG. 7B. However, the block 512 includes a portion acquired by the server 100 other than the difference portion. Transmission of the portion acquired by the server 100 is redundant data transmission.

In light of the above, the server 100 changes the data dividing positions.

Figure 8A:
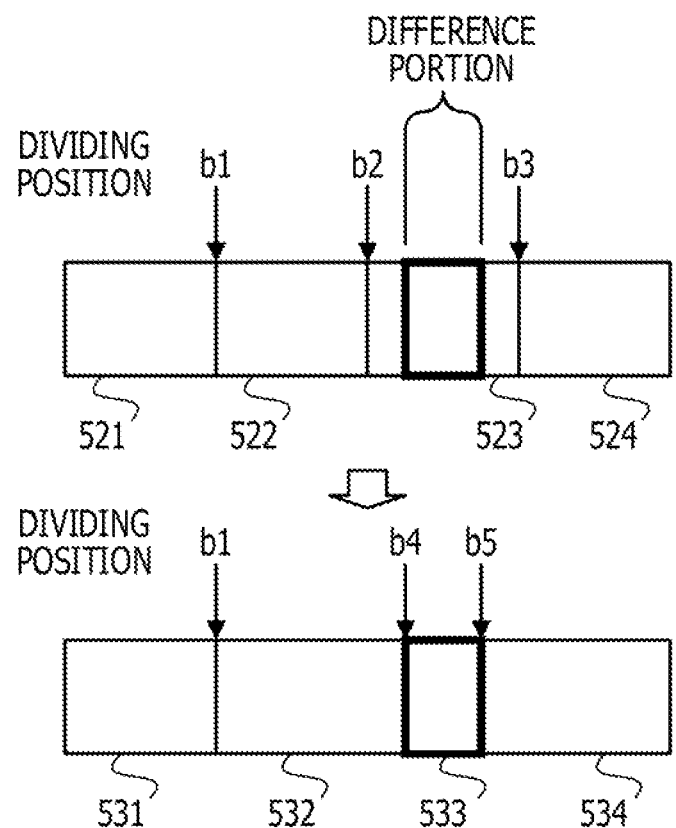
FIGS. 8A and 8B are each a diagram lustrating an example of dividing position update.

FIGS. 8A and 8S are each a diagram illustrating an example of dividing position update.

FIG. 8A illustrates an example of dividing position update when a difference portion exists at a portion inside a single block. In the example of FIG. 8A, a difference portion exists at a portion inside the block 523 among the blocks 521, 522, 523, and 524 corresponding to the data dividing positions b1, b2, and b3. In this case, the block update unit 140 updates the dividing positions of the data to dividing positions b1, b4, and b5. The data is divided into blocks 531, 532, 533, and 534 at the dividing positions b1, b4, and b5. Among these, the block 533 for the dividing positions b4 to b5 is a block corresponding to the difference portion inside the block 523.

Figure 8B:
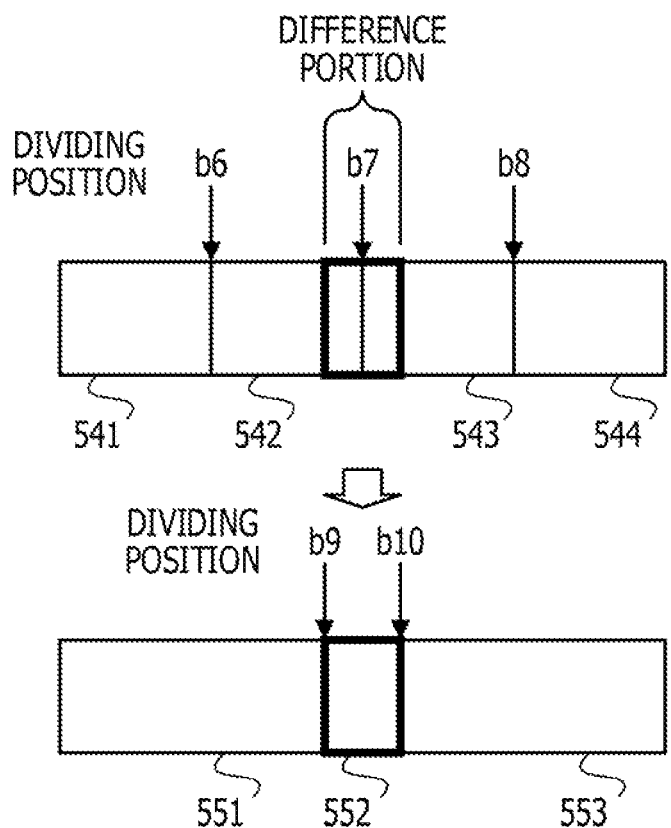

FIG. 8B illustrates an example of dividing position update when a difference portion exists at the boundary between two blocks. In the example of FIG. 8S, a difference portion exists at the boundary between the blocks 542 and 543 among the blocks 541, 542, 543, and 544 corresponding to the data dividing positions b6, b7, and b8. In this case, the block update unit 140 updates the dividing positions of the data to, for example, dividing positions b9 and b10. The data is divided into blocks 551, 552, and 553 at the dividing positions b9 and b10. Among these, the block 552 for the dividing positions b9 to b10 is a block corresponding to the difference portion at the boundary between the blocks 542 and 543.

There may be a plurality of relatively small difference portions in one dataset as a transmission target. In this case, when each of the plurality of small difference portions is made into a block, the number of collations of hash values for the blocks on the edge side increases, or the number of transmissions of the transmission target blocks is easily performed, and data collection by the server 100 is delayed. Thus, the server 100 executes logical-physical conversion processing that combines the relatively small difference portions into one.

Figure 9:
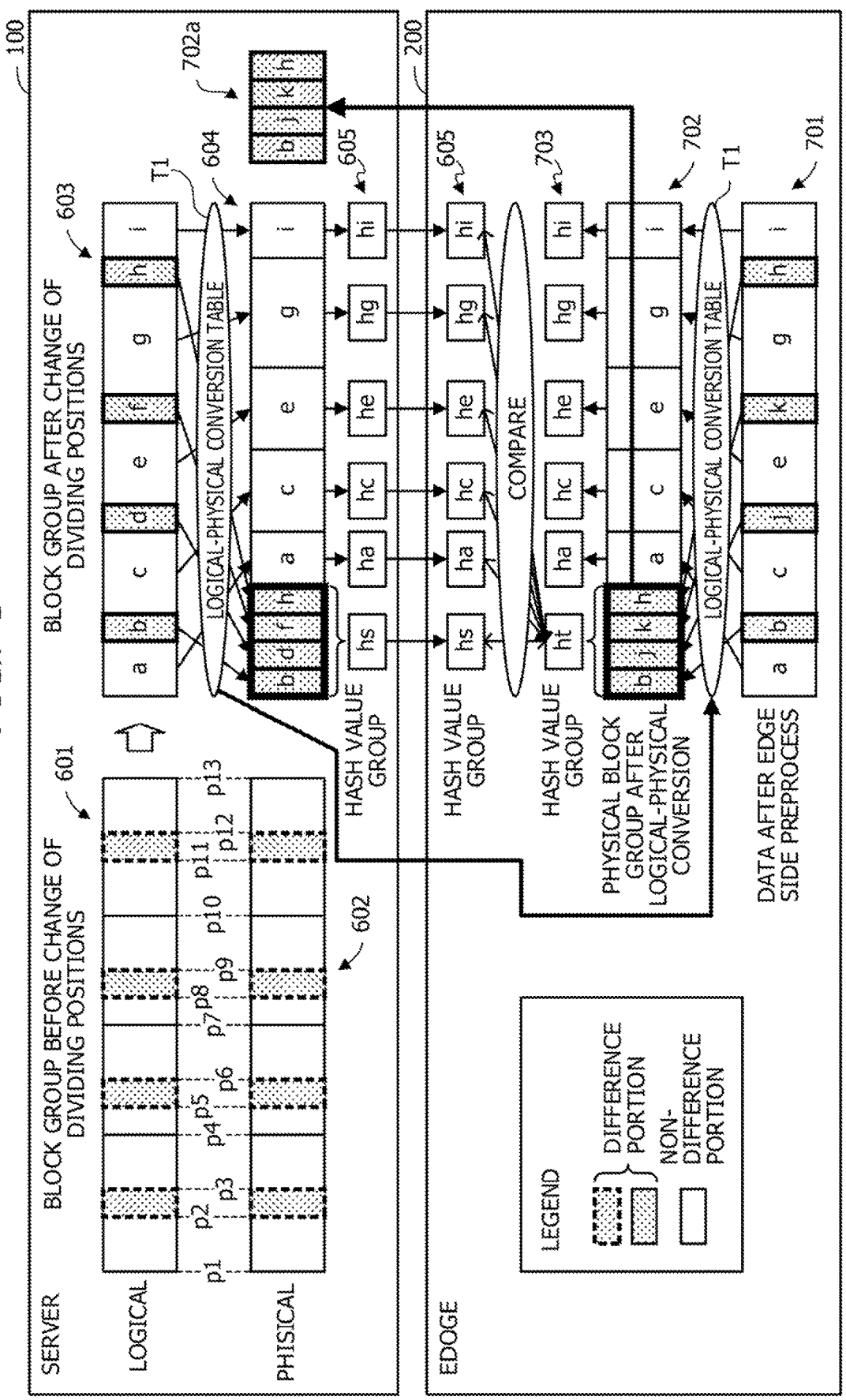
FIG. 9 is a diagram illustrating an example of logical-physical conversion.

FIG. 9 is a diagram illustrating an example of logical-physical conversion.

The server 100 receives data corresponding to a logical block group 601 from the edge 200. The logical block group 601 is a logical block group before the dividing positions are changed. FIG. 9 illustrates addresses p1 to p13 for the logical block group 601 and the physical block group 602. Among these, the data is divided into four logical blocks according to three dividing positions of addresses p4, p7, and p10. The logical block group 601 includes these four logical blocks.

The sections of the addresses p2 to p3 is the first difference portion of the data currently acquired as compared with the data acquired previously from the edge 200. The section of the addresses p5 to p6 is the second difference portion of the data currently acquired as compared with the data acquired previously from the edge 200. The section of the addresses p8 to p9 is the third difference portion of the data currently acquired as compared with the data acquired previously from the edge 200. The section of the addresses p11 to p12 is the fourth difference portion of the data currently acquired as compared with the data acquired previously from the edge 200.

The physical block group 602 is a physical block group before the dividing positions are changed, and is the same block group as the logical block group 601.

The server 100 changes the logical block group 601 to the logical block group 603 by changing the dividing positions so that the above four difference portions are made into a single logical block. Here, a logical block having a logical block ID (IDentifier) "x" is expressed as "logical block x". A physical block having the same content as the logical block x may be expressed as "physical block x".

The logical block group 603 has nine logical blocks of logical blocks a, b, c, d, e, f, g, h, and i in the order of addresses. The logical block a corresponds to the section of the addresses p1 to p2. The logical block b corresponds to the difference portion of the addresses p2 to p3. The logical block c corresponds to the section of the addresses p3 to p5. The logical block d corresponds to the difference portion of the addresses p5 to p6. The logical block e corresponds to the section of the addresses p6 to p8. The logical block f corresponds to the difference portion of the addresses p8 to p9, The logical block g corresponds to the section of the addresses p9 to p11 The logical block h corresponds to the difference portion of the addresses p11 to p12.

For example, assume that the size of each of the logical blocks b, d, f, and h is less than a predetermined threshold value. In this case, the server 100 generates a logical-physical conversion table T1 so as to generate a physical block group 604 in which the logical blocks b, d, f, and h are aggregated at the start of the data to form a single block. The physical block group 604 has a total of six physical blocks including the start physical block obtained by gathering the logical blocks b, d, f, and h into a single block, and the subsequent physical blocks a, c, e, g, and i. The server 100 generates a logical-physical conversion table T1 that specifies a method of conversion from the logical block group 603 to the physical block group 604.

Moreover, the server 100 inputs the physical blocks included in the physical block group 604 to a predetermined hash function, and obtains a hash value group 605. The hash value group 605 includes hash values hs, ha, hc, he, hg, and h1.

The hash value hs is a hash value of the physical block obtained by gathering the logical blocks b, d, f, and h into a single block. The hash value ha is a hash value of the physical block a. The hash value hc is a hash value of the physical block c. The hash value he is a hash value of the physical block e. The hash value hg is a hash value of the physical block g. The hash value h1 is a hash value of the physical block i.

The server 100 transmits the hash value group 605 and the logical-physical conversion table T1 to the edge 200. The edge 200 receives the hash value group 605 and the logical-physical conversion table T1.

The edge 200 holds preprocessed data 701. The edge 200 divides the preprocessed data 701 into a logical block group based on the logical-physical conversion table T1. The logical block group includes logical blocks a, b, c, j, e, k, g, h, and i in the order of addresses. The logical block j is a logical block corresponding to the block position of the logical block d. The logical block k is a logical block corresponding to the block position of the logical block f.

The edge 200 performs logical-physical conversion on the logical blocks a, b, c, j, e, k, g, h, and i based on the logical-physical conversion table T1, and generates a physical block group 702. The physical block group 702 has a total of six physical blocks including the start physical block obtained by gathering the logical blocks b, j, k, and h into a single block, and the subsequent physical blocks a, c, e, g, and i.

The edge 200 inputs the physical blocks included in the physical block group 702 to the same hash function as the hash function that the server 100 has, and obtains a hash value group 703. The hash value group 703 includes hash values ht, ha, hc, he, hg, and hi. The hash value ht is a hash value of the physical block obtained by gathering the logical blocks b, j, k, and h into a single block.

The edge 200 compares the hash values of the hash value group 703 with the hash values of the hash value group 605. The hash values ha, hc, he, hg, and hi are included in both the hash value groups 605 and 703. The hash value ht is not included in the hash value group 605. Therefore, the edge 200 transmits to the server 100 the physical block (physical block 702a) obtained by gathering the logical blocks b, j, k, and h into a single block, and does not transmit the physical blocks a, c, e, g, and i to the server 100.

As described above, by executing the logical-physical conversion processing that combines relatively small difference portions into one, the server 100 may reduce the number of comparisons of hash values and the number of transmissions of data, suppress delay in data collection by the server 100, and improve data collection efficiency.

FIG. 10 is a diagram illustrating an example of a logical-physical conversion table.

The logical-physical conversion table T1 is generated by the logical-physical conversion unit 150 and stored in the storage unit 120. A duplicate of the logical-physical conversion table T1 is provided from the server 100 to the edge 200 and stored in the storage unit 220. The logical-physical conversion table T1 includes items of physical block ID, logical block ID, logical address, physical address, and size.

A physical block ID is registered in the item of physical block ID. A logical block ID is registered in the item of logical block ID. In the item of logical address, a logical address indicating the start position of the corresponding logical block in the data (logical block group) is registered.

In the item of physical address, a physical address indicating the start position of the corresponding physical block in the data (physical block group) after logical-physical conversion is registered. In the item of size, the size of the corresponding logical block is registered. The unit of size is, for example, bytes (bytes).

For example, in the logical-physical conversion table T1, a record is registered having a physical block ID "0", a logical block ID "b", a logical address "0xaaaabbbb", a physical address "0x00000000", and a size "16". This record indicates that a logical block with the logical block ID "b" (logical block b) belongs to the physical block with the physical block ID "0", the logical address of the logical block b is "0xaaaabbbb", the physical address after logical-physical conversion is "0x00000000", and the size is 16 bytes.

In the logical-physical conversion table. T1, for other blocks as well, records indicating the correspondence between logical blocks and physical blocks are registered. According to the example of the logical-physical conversion table T1, the logical blocks b, j, k, and h belong to the physical block with the physical block ID "0". The logical block a belongs to the physical block with the physical block ID "1". The logical block c belongs to the physical block with the physical block ID "2".

Immediately before the server 100 starts collecting data from the edge 200, the setting values of the items of physical block ID and physical address may be the same as the setting values (initial values) of the items of logical block ID and logical address. The items of logical block ID and logical address correspond to the information on the dividing position of the blocks (logical blocks).

Next, processing procedures of the server 100 and the edge 200 according to the second embodiment will be described. The edges 300, 400, . . . perform the same procedures as the edge 200. The server 100 executes the same procedures as those for the edge 200 also for the edges 300, 400, . . . .

Figure 11:
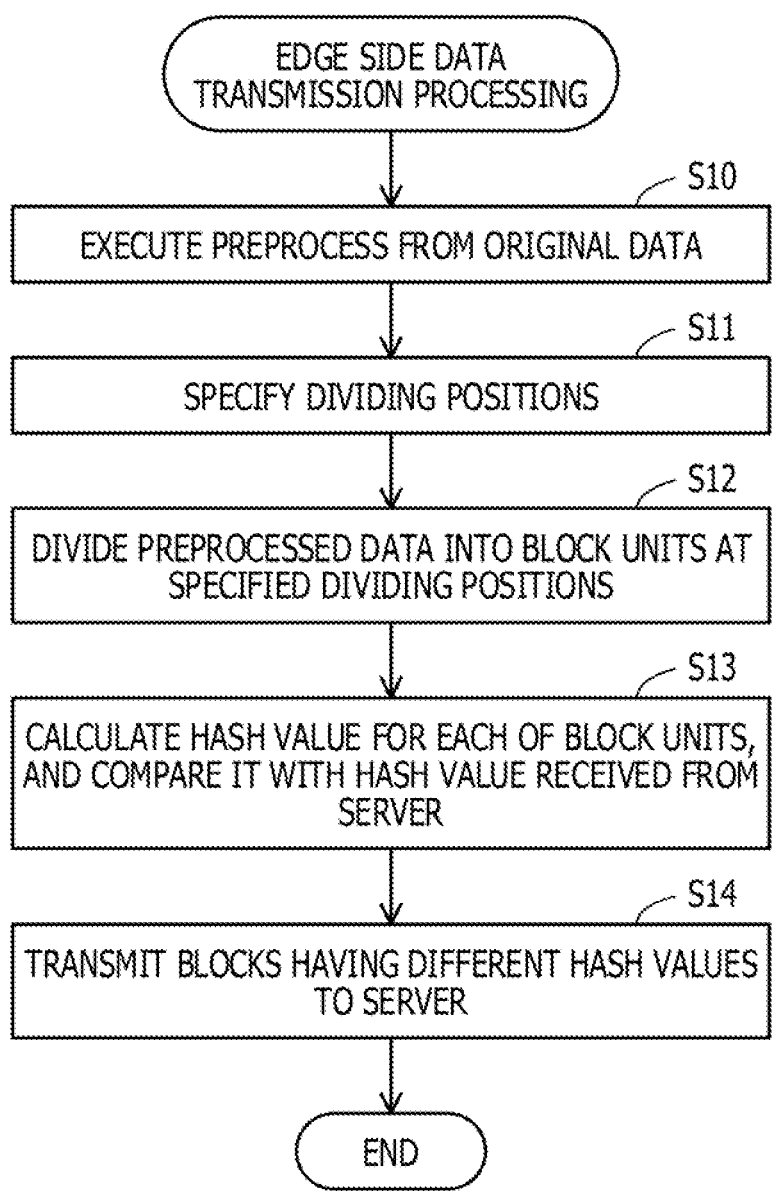
FIG. 11 is a flowchart illustrating an example (part 1) of edge side data transmission processing.

FIG. 11 is a flowchart illustrating an example (part 1) of edge side data transmission processing.

Assume that the edge 200 holds information on the initial block dividing positions in the storage unit 220. When receiving the first data from the edge 200, due to the absence of previous data, the server 100 divides the first data into logical blocks based on the information on the initial block dividing positions, calculates the hash value for each logical block, and transmits the hash values to the edge 200. The procedures of FIG. 11 are started when the server 100 receives the first data from the edge 200 and then the edge 200 receives the hash value for each logical block in the first data from the server 100.

(S10) The preprocessing unit 230 performs a preprocess on the current original preprocess target data stored in the storage unit 220, and generates preprocessed data.

(s11) The block division unit 240 specifies the dividing positions for the preprocessed data based on the block dividing position information of the logical-physical conversion table stored in the storage unit 220.

(S12) The block division unit 240 divides the preprocessed data into block units at the specified dividing positions. Initially, as the physical block ID and the physical address, the logical-physical conversion table has the same setting values as the logical block ID and the logical address. For this reason, the logical-physical conversion unit 250 does not have to perform logical-physical conversion. However, the logical-physical conversion unit 250 may perform logical-physical conversion. Even when logical-physical conversion is performed, the logical block group and the physical block group after logical-physical conversion are the same.

(S13) The hash value generation unit 260 calculates a hash value for each of the block units divided in step S12, and compares it with the hash value received from the server 100.

(S14) The sending processing unit 270 transmits blocks having different hash values (logical block =physical block in the example of FIG. 11) to the server 100. Here, the sending processing unit 270 also transmits the logical block IDs of the corresponding logical blocks (logical block ID =physical block ID in the example of FIG. 11) to the server 100, The edge 200 ends the above data transmission processing.

Figure 12:
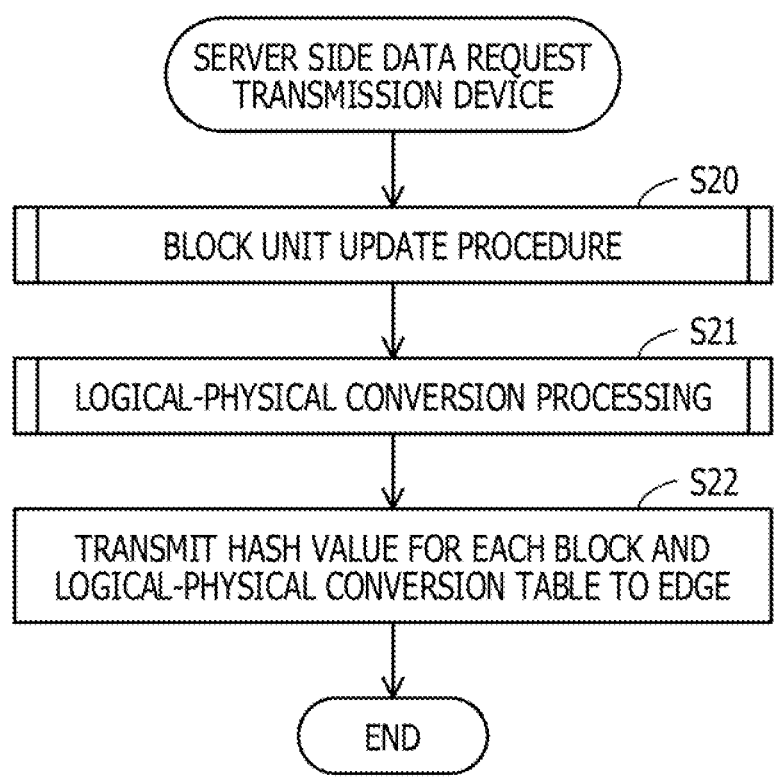
FIG. 12 is a flowchart illustrating an example of server side data request transmission processing.

FIG. 12 is a flowchart illustrating an example of server side data request transmission processing.

When the server 100 receives a block from the edge 200, the server 100 starts the following procedures.

(S20) The block update unit 140 executes block unit update processing based on the previous data acquired from the edge 200 and the current data. Details of the block unit update processing will be described later.

Based on the logical-physical conversion table and the physical block ID received from the edge 200, the block update unit 140 specifies the block position of the difference portions as compared with the previous data. The block update unit 140 obtains the current data regarding the edge 200 by replacing the block position with the block currently acquired (the block currently acquired from the edge 200).

(S21) The logical-physical conversion unit 150 executes logical-physical conversion processing. The logical-physical conversion unit 150 generates a logical-physical conversion table T1 by logical-physical conversion processing. Details of the logical-physical conversion process will be described later.

(S22) The hash value generation unit 160 transmits the hash value for each physical block and the logical-physical conversion table T1 to the edge 200. The hash value generation unit 160 then ends the data request transmission processing.

As exemplified in step S20, when receiving a block, the server 100 receives from the edge 200 identification information (for example, a physical block ID or a logical block ID) indicating the position of the block in the current data held by the edge 200. Based on the identification information, the server 100 obtains the current data by replacing some blocks of the previous data with the blocks currently received.

Figure 13:
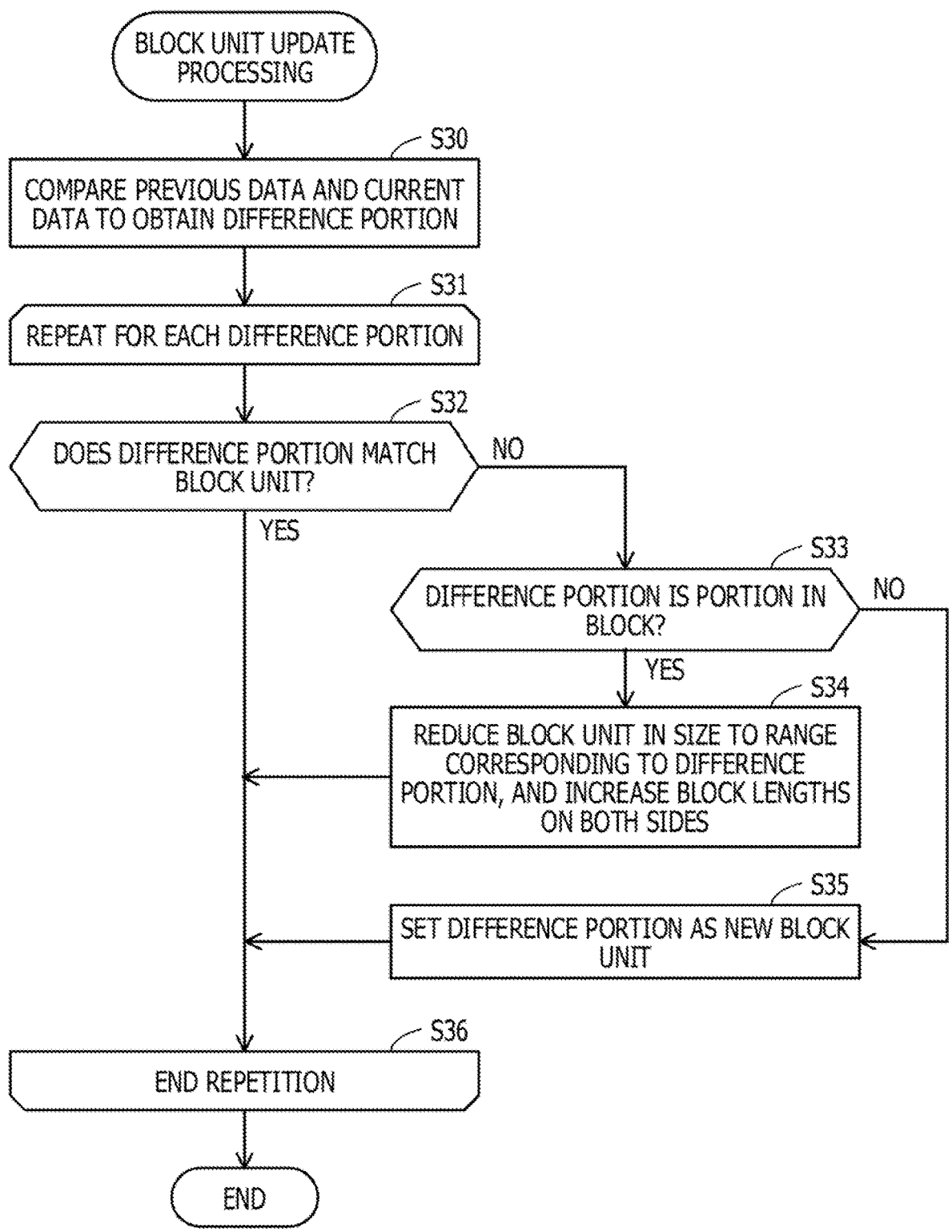
FIG. 13 is a flowchart illustrating an example of block unit update processing.

FIG. 13 is a flowchart illustrating an example of block unit update processing.

The block unit update processing corresponds to step S21.

(S30) The block update unit 140 compares the previous data acquired from the edge 200 with the current data, and acquires a difference portion (logical address range).

(S31) The block update unit 140 repeatedly executes step S32, steps S32 to S34, or steps S32, S33, and S35 for each difference portion.

(S32) The block update unit 140 determines whether or not the difference portion matches the current block unit in the logical-physical conversion table. When they match, the processing proceeds to step S36. When they do not match, the processing proceeds to step S33, The current block unit is represented by a logical address range indicated by the logical address and size set in the current logical-physical conversion table.

(S33) The block update unit 140 determines whether or not the difference portion is a portion in a logical block. When the difference portion is a portion in the logical block, the processing proceeds to step S34. When the difference portion is not a portion of the logical block, the processing proceeds to step S35. Step S33 No corresponds to the case where the difference portion straddles two logical blocks.

(S34) The block update unit 140 reduces the block unit in size to a range corresponding to the difference portion, and increases the block lengths on both sides. The details are as illustrated in FIG. 8A. The processing proceeds to step S36.

(S35) The block update unit 140 sets the difference portion as a new block unit. In this case, for example, the block lengths of the adjacent blocks (the blocks adjacent to the portions obtained by subtracting the difference portion from the corresponding blocks) are increased. The details are as illustrated in FIG. 8B. The processing proceeds to step S36.

(S36) The block update unit 140 completes the repetition when the processing for all the difference portions acquired in step S30 is completed. The block update unit 140 then ends the block unit update processing.

Figure 14:
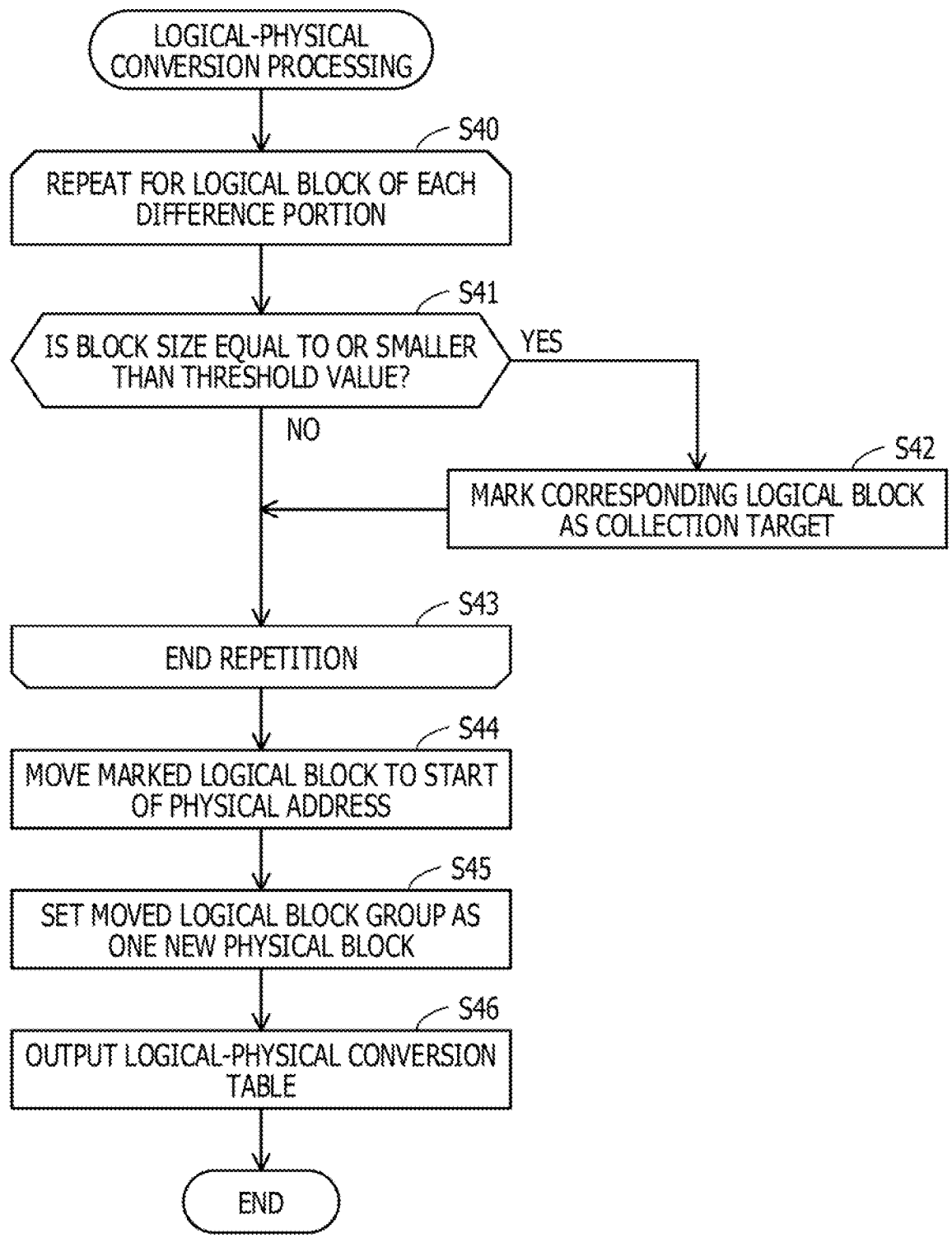
FIG. 14 is a flowchart illustrating an example of logical-physical conversion processing.

FIG. 14 is a flowchart illustrating an example of logical-physical conversion processing.

(S40) The logical-physical conversion unit 150 repeatedly executes Step S41 or Steps S41 and S42 for the logical blocks of each difference portion.

(S41) The logical-physical conversion unit 150 determines whether or not the block size of the corresponding logical block is equal to or less than a threshold value. When the block size is equal to or less than the threshold value, the processing proceeds to step S42. When the block size is greater than the threshold value, the processing proceeds to step S43. The threshold value for block size is preset in the storage unit 120 or the like. The block size threshold value is, for example, about 5 to 10% of the size of data to be transmitted by the edge 200. Note that any size may be set as the threshold value for block size.

(S42) The logical-physical conversion unit 150 marks the corresponding logical block as a collection target. For example, the logical-physical conversion unit 150 records the logical block ID of that logical block as a collection target logical block in an area other than the logical-physical conversion table in the storage unit 120. Alternatively, the logical-physical conversion unit 150 may provide a setting item for a flag in the logical-physical conversion table, and mark the flag with "True" (collection target) and "False" (not collection target). The processing proceeds to step S43.

(S43) When the processing for all the logical blocks in a difference portion is finished, the logical-physical conversion unit 150 completes the repetition, and the processing proceeds to step S44.

(S44) The logical-physical conversion unit 150 moves the logical block marked in step S42 to the start of the physical address.

(S45) The logical-physical conversion unit 150 sets the moved logical block group as one new physical block.

(S46) The logical-physical conversion unit 150 generates a logical-physical conversion table T1 in which the physical block ID and the physical block address are set so that the unmarked logical blocks follow the physical block created in step S45 in the order of logical addresses. The logical-physical conversion unit 150 outputs the generated logical-physical conversion table T1 to the storage unit 120. The logical-physical conversion unit 150 then ends the logical-physical conversion processing.

As described above, the server 100 divides the acquired data into a plurality of logical blocks when there are difference portions having a size less than the threshold value, and then generates, from the plurality of logical blocks, a plurality of physical blocks (a plurality of additional blocks) including one block obtained by gathering the difference portions (logical blocks) having a size less than the threshold value at the start. The server 100 transmits to the edge 200 the hash value for each block included in the plurality of physical blocks, the information on the dividing positions, and the conversion information used for conversion from a plurality of logical blocks to a plurality of physical blocks (information on the correspondence between logical addresses and physical addresses).

FIG. 15 is a flowchart illustrating an example (part 2) of the edge side data transmission process.

The procedures of FIG. 15 are executed when the logical block. ID and the physical block ID are different in the logical-physical conversion table T1 currently received by the edge 200 from the server 100 together with the hash values.

(S50) The preprocessing unit 230 performs a preprocess on the current original preprocess target data stored in the storage unit 220, and generates preprocessed data.

(S51) The block division unit 240 specifies the dividing positions for the preprocessed data based on the logical-physical conversion table T1 stored in the storage unit 220.

(S52) The block division unit 240 divides the preprocessed data into block units at the specified dividing positions. This generates a logical block group corresponding to the preprocessed data.

(S53) The logical-physical conversion unit 250 uses the logical-physical conversion table T1 to convert the logical address of each logical block in the logical block group generated in step S52 into a physical address.

(S54) The hash value generation unit 260 calculates the hash value for each of the physical block units indicated by the logical-physical conversion table T and compares it with the hash value received from he server 100.

(S55) The sending processing unit 270 transmits physical blocks having different hash values to the server 100. Here, the sending processing unit 270 also transmits the physical block IDs of the corresponding physical blocks to the server 100. The edge 200 ends the above data transmission processing.

The server 100 refers to the logical-physical conversion table T1, and converts the physical block IDs of the received physical blocks into one or more logical block IDs. The server 100 acquires current data related to the edge 200 by replacing the logical block with the corresponding logical block. ID in the logical block group previously acquired from the edge 200 with the logical block currently acquired from the edge 200 (converted from the physical block).

As above, by changing the data dividing positions, the server 100 may reduce the data transfer volume.

For example, it is also conceivable not to change the initially determined block dividing positions. However, in this case, the edge transmits a whole block even when there is a difference in a portion of the block, and it is impossible to sufficiently reduce the data transfer volume.

In light of the above, the server 100 dynamically updates the block dividing positions according to the comparison between the data previously acquired from the edge 200 and the data currently acquired. For this reason, when there is a relatively high possibility of an update in a portion of a block, it is possible to suppress redundant transfer of data other than the updated portion. For example, it is possible to improve the efficiency of difference detection by physically gathering relatively small blocks with a high possibility of update to obtain a hash value. In the edge, when the change in the update positions in the data in a certain period is relatively small, or when the update positions in the data in a certain period do not change, the data collection method by the server 100 increases the effect of reducing the transfer volume.

Even when each edge has relatively low performance (for example, the memory capacity on the edge side is small and capable of holding only the data for next transmission), or when the communication band between the base stations 51, 52 and each edge is narrow, it is possible to suppress the data transfer volume from the edge and efficiently collect data.

The information processing according to the first embodiment may be achieved by causing the processing unit 12 to execute a program. The information processing according to the second embodiment may be achieved by causing the CPU 101 to execute a program. The program may be recorded in the recording medium 113 that is computer-readable.

For example, the program may be delivered by distributing the recording medium 113 having the program recorded thereon. Alternatively, the program may be stored in another computer and distributed via a network. For example, the computer stores (installs) a program recorded on the recording medium 113 or a program received from another computer in a storage device such as the RAM 102 or the HDD 103, and reads and executes the program from the storage device.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable recording medium storing a program that causes a computer to execute a process, the process comprising:
    comparing first data previously acquired from a data transmission source device and second data currently acquired from the data transmission source device to specify a difference portion of the second data as compared with the first data;
    determining a dividing position of the second data so that the difference portion is made into a single block;
    dividing the second data into a plurality of first blocks at the determined dividing position;
    transmitting, to the data transmission source device, a first hash value for each of the plurality of first blocks and information on the dividing position; and
    receiving, from the data transmission source device, a second block corresponding to a second hash value different from the first hash value for each of the plurality of first blocks, among second blocks obtained by dividing third data held by the device based on the information on the dividing position, the third data is acquired by:

when receiving the second blocks, receiving from the data transmission source device identification information indicating positions of the second blocks in the third data; and replacing a block at a position in the second data indicated by the identification information with a corresponding one of the second blocks.

2. The recording medium according to claim 1, wherein the transmitting includes:

dividing the second data into the plurality of first blocks when there are difference portions having a size less than a threshold value;

generating, from the plurality of first blocks, a plurality of additional blocks including one block obtained by gathering difference portions having a size less than the threshold value at a start; and transmitting, to the data transmission source device, a third hash value for each of the blocks included in the plurality of additional blocks, the information on the dividing position, and conversion information used for conversion from the plurality of first blocks to the plurality of additional blocks.

3. The computer-readable recording medium according to claim 1, wherein the acquiring the second data includes:

transmitting, to the data transmission source device, a hash value of each of a plurality of third blocks included in the first data;

receiving, from the data transmission source device, a fourth block corresponding to a hash value different from the hash value of each third block, among a plurality of fourth blocks included in the second data; and applying the received fourth block to the first data.

4. A data collection device comprising:

a memory; and a processor coupled to the memory and configured to:

compare first data previously acquired from a data transmission source device and second data currently acquired from the data transmission source device to specify a difference portion of the second data as compared with the first data;

determine a dividing position of the second data so that the difference portion is made into a single block;

divide the second data into a plurality of first blocks at the determined dividing position;

transmit, to the data transmission source device, a first hash value for each of the plurality of first blocks and information on the dividing position;

receive, from the data transmission source device, a second block corresponding to a second hash value different from the first hash value for each of the plurality of first blocks, among second blocks obtained by dividing third data held by the device based on the information on the dividing position;

when receiving the second blocks, receive from the data transmission source device identification information indicating positions of the second blocks in the third data; and receive the third data by replacing a block at a position in the second data indicated by the identification information with a corresponding one of the second blocks.

5. A data collection method executed by a processor included in a computer, the data collection method comprising:

comparing first data previously acquired from a data transmission source device and second data currently acquired from the data transmission source device to specify a difference portion of the second data as compared with the first data;

determining a dividing position of the second data so that the difference portion is made into a single block;

dividing the second data into a plurality of first blocks at the determined dividing position;

transmitting, to the data transmission source device, a first hash value for each of the plurality of first blocks and information on the dividing position; and receiving, from the data transmission source device, a second block corresponding to a second hash value different from the first hash value for each of the plurality of first blocks, among second blocks obtained by dividing third data held by the device based on the information on the dividing position, the third data is acquired by:

when receiving the second blocks, receiving from the data transmission source device identification information indicating positions of the second blocks in the third data; and replacing a block at a position in the second data indicated by the identification information with a corresponding one of the second blocks.

* * * * *